H. S. GIPE.
MACHINE FOR COVERING THE TOPS AND BOTTOMS OF BOXES.
APPLICATION FILED JUNE 18, 1917.

1,289,729. Patented Dec. 31, 1918.
10 SHEETS—SHEET 1.

Inventor
Harrison S. Gipe.

H. S. GIPE.
MACHINE FOR COVERING THE TOPS AND BOTTOMS OF BOXES.
APPLICATION FILED JUNE 18, 1917.

1,289,729.

Patented Dec. 31, 1918.
10 SHEETS—SHEET 2.

H. S. GIPE.
MACHINE FOR COVERING THE TOPS AND BOTTOMS OF BOXES.
APPLICATION FILED JUNE 18, 1917.

1,289,729.

Patented Dec. 31, 1918.
10 SHEETS—SHEET 4.

Witnesses
R. F. Harwood
C. R. Ziegler

Inventor
Harrison S. Gipe.
By Joshua R. H. Potts
His Attorney

H. S. GIPE.
MACHINE FOR COVERING THE TOPS AND BOTTOMS OF BOXES.
APPLICATION FILED JUNE 18, 1917.

1,289,729.

Patented Dec. 31, 1918.
10 SHEETS—SHEET 6.

Harrison S. Gipe.

H. S. GIPE.
MACHINE FOR COVERING THE TOPS AND BOTTOMS OF BOXES.
APPLICATION FILED JUNE 18, 1917.
1,289,729.
Patented Dec. 31, 1918.
10 SHEETS—SHEET 1.
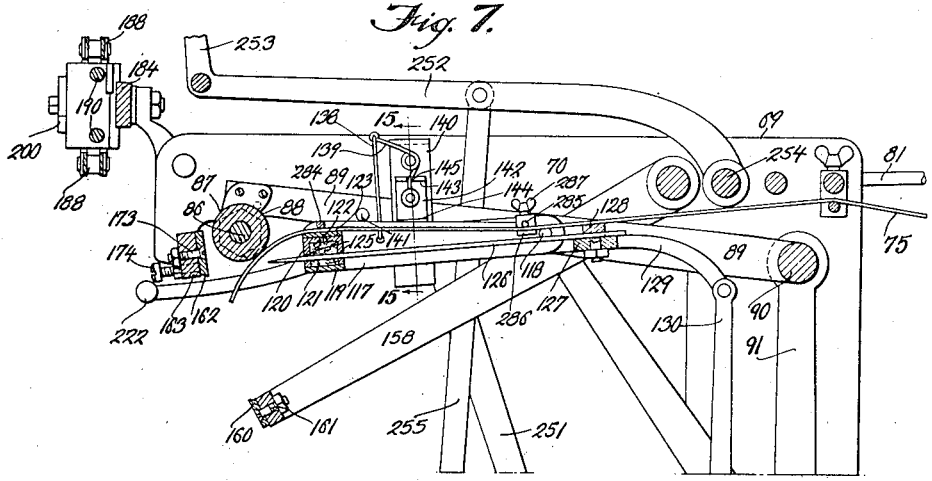
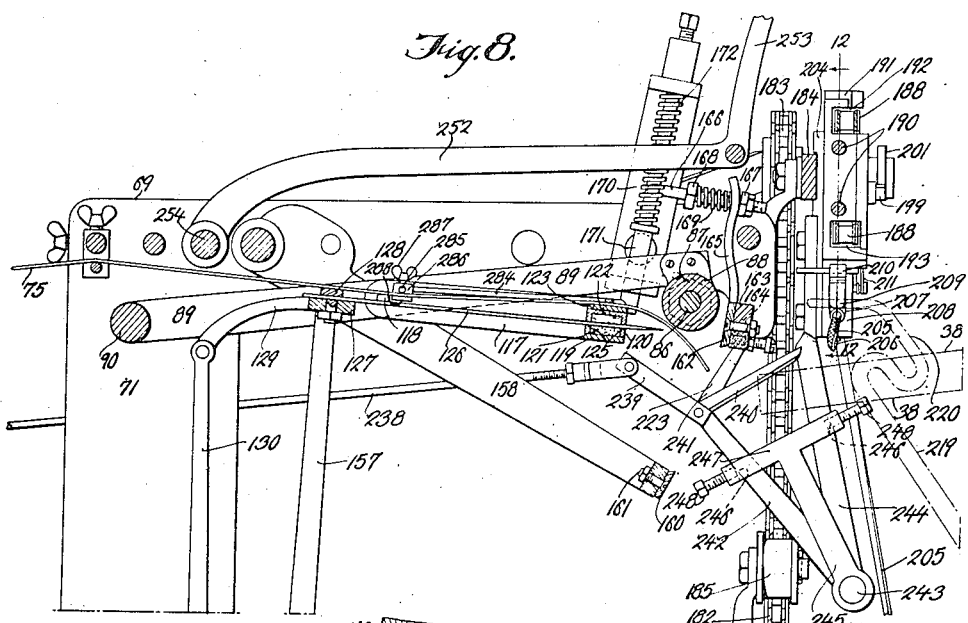
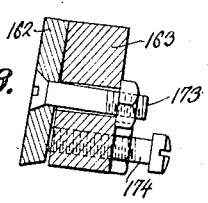

H. S. GIPE.
MACHINE FOR COVERING THE TOPS AND BOTTOMS OF BOXES.
APPLICATION FILED JUNE 18, 1917.

1,289,729.

Patented Dec. 31, 1918.
10 SHEETS—SHEET 8.

Witnesses
R. Harwood.
C. R. Ziegler.

Inventor
Harrison S. Gipe.
By
Joshua R. H. Potts
His Attorney

H. S. GIPE.
MACHINE FOR COVERING THE TOPS AND BOTTOMS OF BOXES.
APPLICATION FILED JUNE 18, 1917.
1,289,729.
Patented Dec. 31, 1918.
10 SHEETS—SHEET 9.
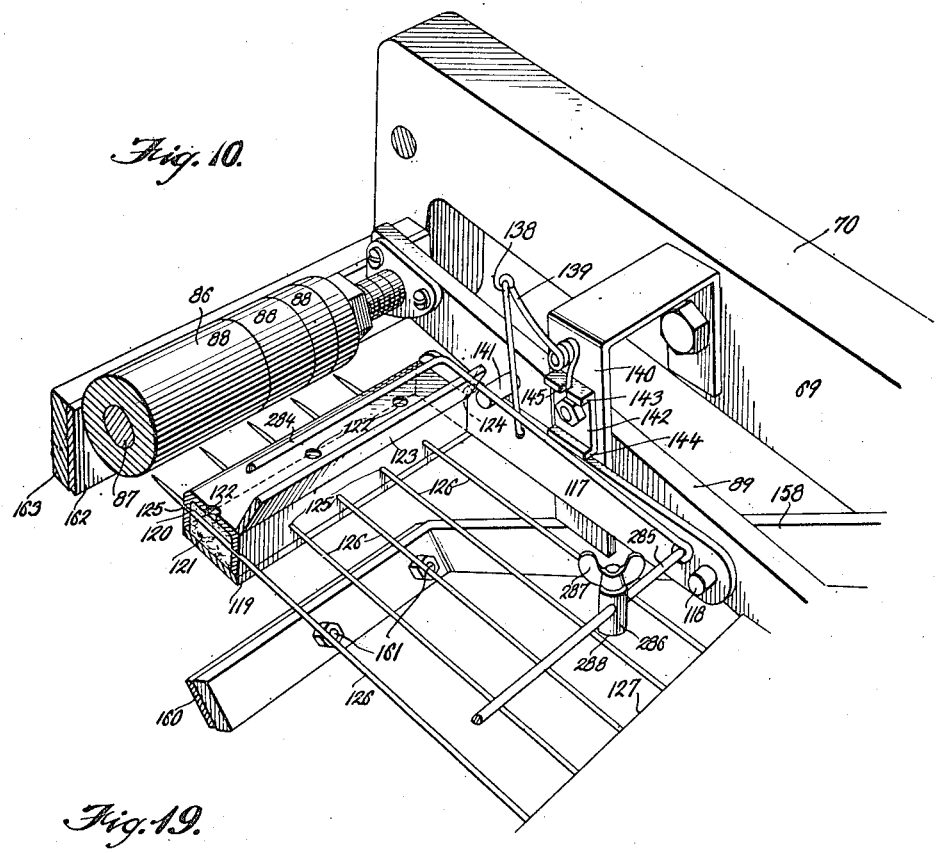
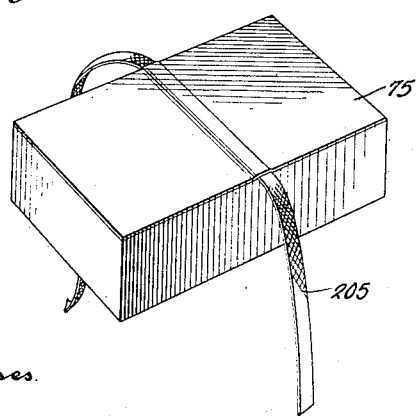
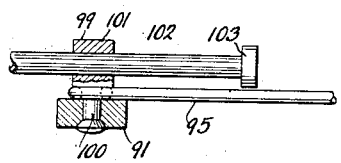
Witnesses.
Inventor.
Harrison S. Gipe.

H. S. GIPE.
MACHINE FOR COVERING THE TOPS AND BOTTOMS OF BOXES.
APPLICATION FILED JUNE 18, 1917.
1,289,729.
Patented Dec. 31, 1918.
10 SHEETS—SHEET 10.
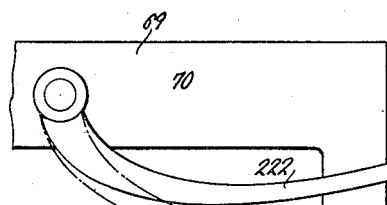
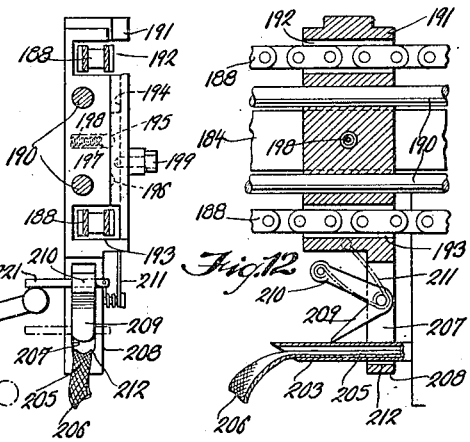
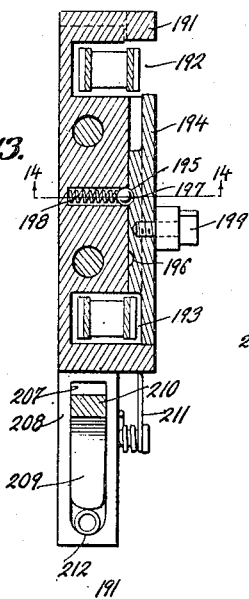
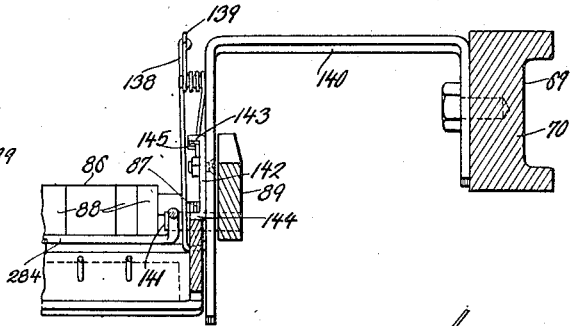
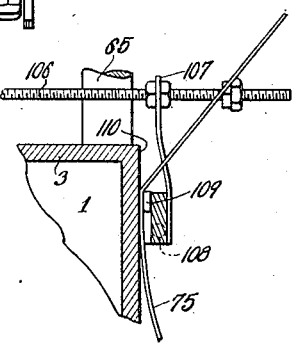
Inventor
Harrison S. Gipe.

UNITED STATES PATENT OFFICE.

HARRISON S. GIPE, OF HERSHEY, PENNSYLVANIA.

MACHINE FOR COVERING THE TOPS AND BOTTOMS OF BOXES.

1,289,729.　　　　　Specification of Letters Patent.　　Patented Dec. 31, 1918.

Application filed June 18, 1917.　Serial No. 175,390.

*To all whom it may concern:*

Be it known that I, HARRISON S. GIPE, a citizen of the United States, residing at Hershey, in the county of Dauphin and State of Pennsylvania, have invented certain new and useful Improvements in Machines for Covering the Tops and Bottoms of Boxes, of which the following is a specification.

My invention consists of an improved machine for covering the tops and bottoms of boxes and is particularly adapted for securing sheets of paper on the tops and bottoms of pasteboard boxes.

One object of my invention is to provide an automatic machine of the above described type which will quickly and neatly cover the tops and bottoms of boxes and which can be quickly adjusted to cover boxes of various sizes.

Another object is to provide improved means for applying strips of tape between the covering sheets for the tops or bottoms so that said tape can be used to secure the lids of the boxes to their body portions.

Another object is to provide improved means for initially pressing the adhesive coated strips of paper on the boxes.

A further object is to provide improved cutting means for the strip of covering paper.

A still further object is to provide improved mechanism for feeding the boxes to the above mentioned pressing means and which can be readily adjusted to vary the travel of the box-carrying means.

Another object is to provide tension and holding means for the covering sheet so that the latter can be conveyed through the machine under a desirable and uniform degree of tension.

A further object is to provide improved means for giving a reasonable amount of slack in the covering sheet prior to its passing to the above mentioned holding means.

Another object is to provide means which will operate to firmly place and hold the tape in contact with the box while the covering sheet is being secured thereto.

A still further object is to provide improved means for releasing and cutting the tape after the covering sheet has been applied to the box.

Another object is to provide efficient means for causing a dwell in the movement of the box-conveying means to permit the tape to be cut and released from its shuttle without injuring the paper covering.

Another object of my invention is to make my improved machine of a durable construction which will not easily get out of order.

A further object is to so design my improved machine that it will operate quickly under the control of an operator.

These objects, and other advantageous ends which will be described hereinafter, I attain in the following manner, reference being had to the accompanying drawings in which—

Fig. 7 is an enlarged fragmentary sectional elevation on the line 7—7 of Fig. 3.

Fig. 8 is an enlarged fragmentary sectional elevation taken on the line 8—8 of Fig. 3.

Fig. 10 is a fragmentary perspective showing certain of the elements forming a part of my invention.

Fig. 11 is a fragmentary end view showing certain of the tape-controlling members.

Fig. 12 is a section showing my improved tape shuttle and certain of its co-active members.

Fig. 13 is a longitudinal section of the tape shuttle shown in Fig. 12.

Fig. 14 is a transverse section through the shuttle taken on the line 14—14 of Fig. 13.

Fig. 15 is a fragmentary section taken on the line 15—15 of Fig. 7 showing certain of the elements for supporting the covering paper prior to its application to the boxes.

Fig. 16 is an enlarged fragmentary view of the paper-holding mechanism shown in the extreme rear of Fig. 2.

Fig. 17 is a fragmentary view showing a cam lever limiting device which forms a part of my invention.

Fig. 18 is an enlarged section of one of the knives which forms a part of the paper shearing means.

Fig. 19 is a perspective view showing a box including a paper cover which can be applied by the use of my improved machine, said figure also illustrating a tape which is inserted between the covering sheet and the box.

Figure 1:
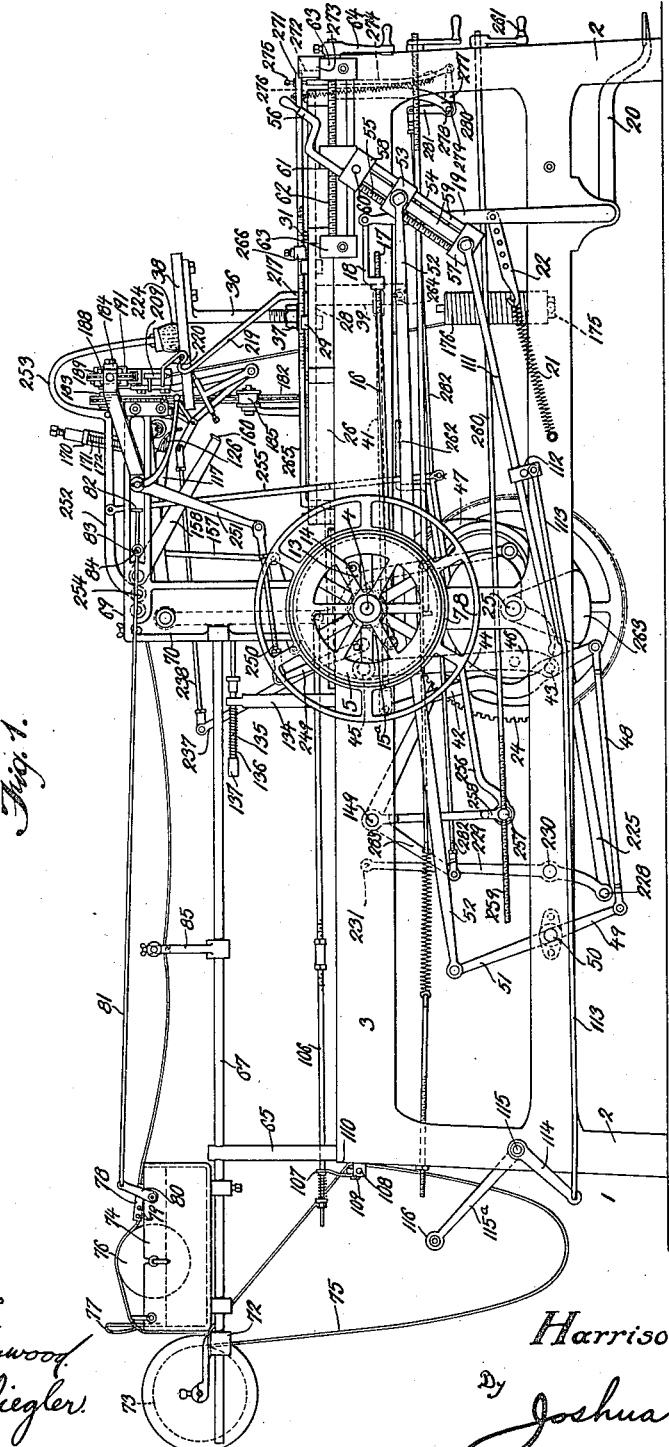
Figure 1 is an elevation view of one side of my improved machine.

Referring to the drawings, 1 represents an elongated main supporting frame which includes legs 2 which are positioned at opposite ends thereof, and a bed 3. The frame 1 forms a bearing for a main driving shaft 4 which has secured to it at one end, a frusto-conical clutch pulley 5.

A spring 6 normally holds this clutch pulley 5 out of contact with a frusto-conical recess 7 on a main driving pulley 8, the latter being loosely mounted to freely rotate on the shaft 4.

A sleeve 9 is mounted so as to rotate on the shaft 4 and has clutch teeth 10 which have angular faces for engagement with clutch teeth 11 on another sleeve 12. The sleeve 12 has an arm 13 thereon which is provided with a hole through which extends a pin 14 which is fixed to the side of the frame 1. The sleeve 12 is backed by a collar 15, and this collar 15 extends from said latter mentioned sleeve to the hub of the pulley 8.

The sleeve 9 has an arm 15ª to which is pivoted a link 16 which has a threaded end 17 for engaging a screw-threaded hole in a connecting arm 18 which is pivoted to a lever 19. This lever 19 is designed to rock within the frame 1 and has a treadle lever 20 secured thereto, said treadle lever being at the forward end of the machine adjacent the operator.

It will thus be noted that when the treadle lever 20 is depressed, the link 16 will operate the arm 15 to partially rotate the sleeve 9. This action will cause the clutch teeth of said sleeve 9 to force the sleeve 12 longitudinally of the shaft to bring the clutch pulley 5 into engagement with the pulley 8 so as to cause the rotation of the main power shaft 4.

The link 16 is moved in an opposite direction through the medium of a spring 21 which is secured at one end to the frame 1, and at its other end to a hook 22 adjustably connected to the arm 19. It will thus be noted that when the treadle lever 20 is released by the foot of the operator, the spring 21 will move the lever 19 and consequently the link 16 to effect the partial rotation of the sleeve 9 in an opposite direction, thus permitting the spring 6 to separate the pulley 8 from the pulley 5, and thus stop the movement of the shaft 4. The above mentioned elements constitute the controlling means by which the operator can start and stop all parts of the machine.

The shaft 4 has a gear wheel 23 secured thereto which meshes with a gear wheel 24 on a lower shaft 25 which will hereinafter be termed the cam shaft, since it has a number of cams thereon which operate and permit the operation of certain of the elements of my invention hereinafter described.

Figure 3:
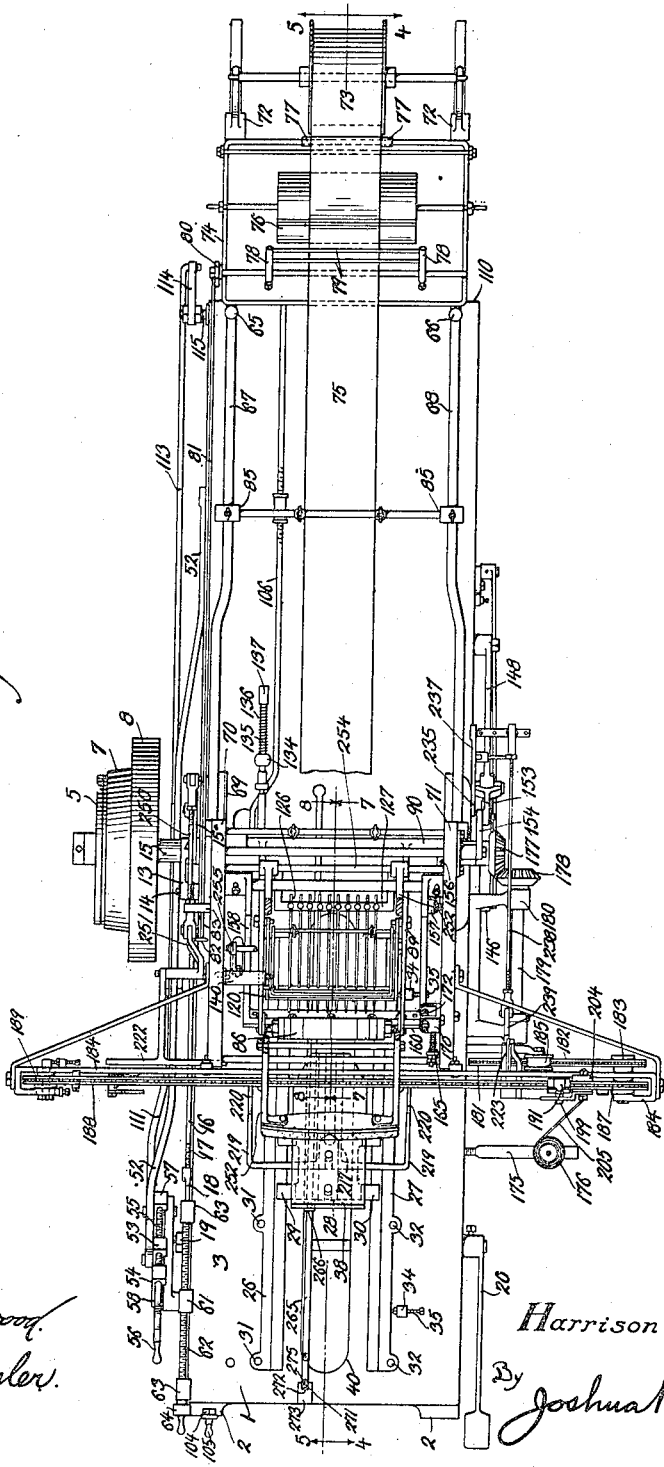
Fig. 3 is a plan view of my improved machine.
Figure 4:
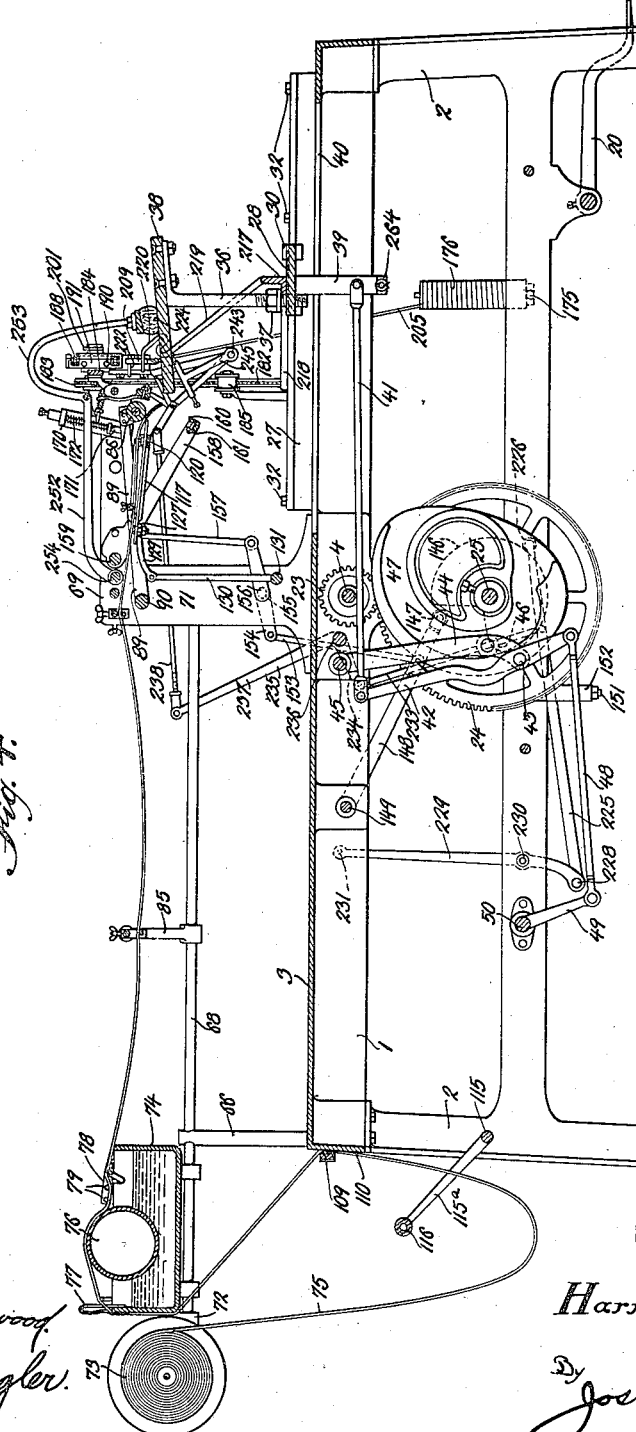
Fig. 4 is a sectional elevation taken on the line 4—4 of Fig. 3.
Figure 5:
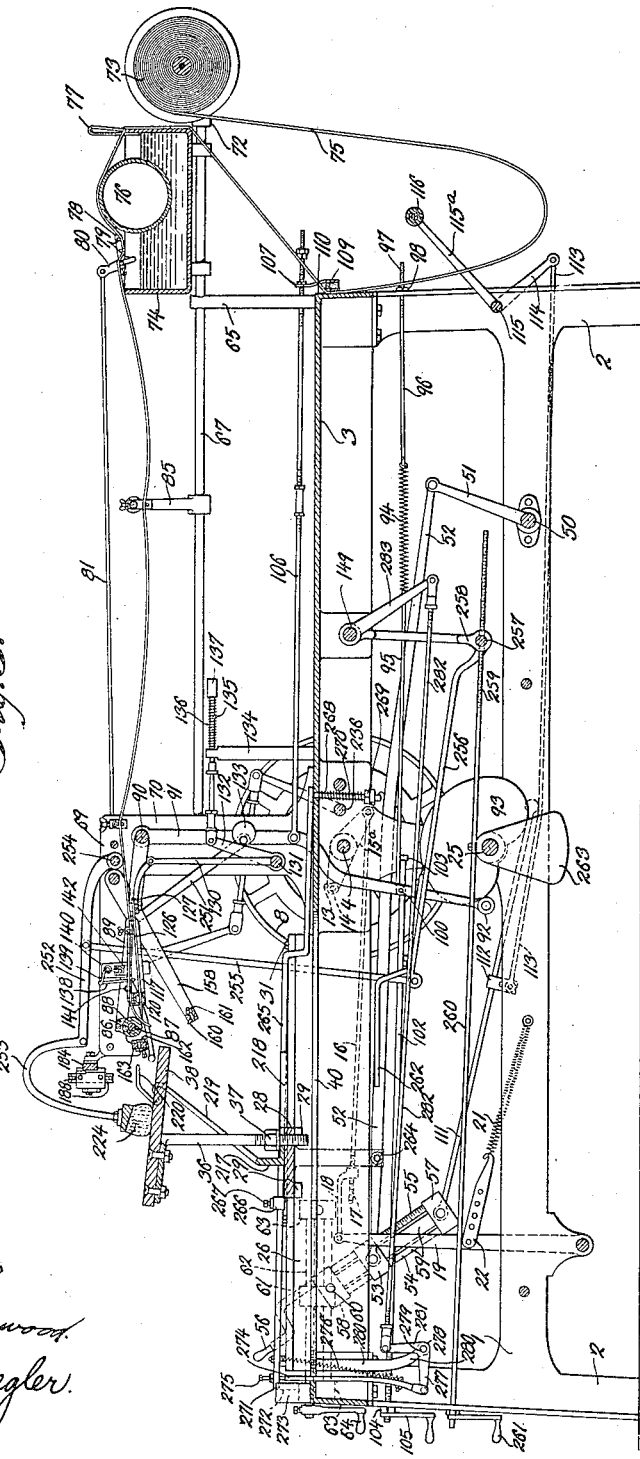
Fig. 5 is a section on the line 5—5 of Fig. 3.

The bed 3 of the frame 1 forms the support for two rails 26 and 27 (see Figs. 3 and 6) which form a slideway for a carriage 28, said carriage having bifurcated edge portions 29 and 30 which embrace the inner edge portions of the respective rails 26 and 27. The rail 26 is secured to the bed 3 by means of bolts 31, and thus the rail 26 is rigidly secured.

The rail 27, on the contrary, is adjustably secured to the bed 3 by means of bolts 32 which pass through the rail 27 and through transversely extending slots 33 in said bed 3. Lugs 34 project at intervals from the top of the bed 3 and adjusting screws 35 extend through these lugs and engage the sides of the rail 27 so that by loosening the bolts 32, the rail 27 may be moved bodily by the adjusting screws 35. After the proper adjustment has been secured, the bolts 32 can be tightened and thus secure the said rail in proper position with respect to the carriage 28.

The carriage 28 carries a threaded post 36 which extends through said carriage and is locked thereon by a nut 37. The post 36 supports a block 38 over which the boxes, which are to be covered, are placed one at a time during the operation of the machine, and it will be understood that the carriage 28 by reciprocating longitudinally between the rails 26 and 27, will move the block 38 forwardly and rearwardly to convey the box to means hereinafter described for applying the covering sheet of paper and the tape.

The carriage 28 has a depending arm 39 which passes through a slot 40 in the bed 3 and this arm 39 has a link 41 pivotally connected thereto (see Figs. 1, 2, 4, and 6). The rear end of the link 41 is pivotally connected to the upper end of a lever 42 (see Fig. 4), said lever 42 being in turn pivoted at 43 to another lever 44. The lever 44 swings upon a rod 45 which extends transversely of and is secured to the frame 1.

An anti-friction roller 46 is rotatably mounted on the lever 44 and is actuated by a cam 47 which is secured to the cam shaft 25. The lower end of the lever 42 has one end of a link 48 pivoted thereto, the opposite end of the link 48 being pivoted to an arm 49 on a rock shaft 50. The rock shaft 50 has another arm 51 secured thereto (see Fig. 1).

A connecting rod 52 pivotally connects the free end of the arm 51 with a block 53 which is mounted on a swinging carriage 54. This carriage has a screw-threaded stem 55, the upper end of which is provided with a handle 56 whereby said stem can be rotated. The stem 55 passes through a threaded opening in the block 53 and has a thrust bearing upon a block 57 which is secured to an upper block 58 by two guiding bars 59 for the block 53.

The block 58 is pivoted at 60 to a member 61 which has a threaded opening into which fits a threaded shaft 62 mounted in suitable bearings 63 on the side of the frame 1. The shaft 62 at its forward end is provided with a handle 64, so that a rotation thereof in opposite directions will move the member 61, and consequently the swinging carriage 54 forwardly and rearwardly.

It will thus be seen that the rotation of the cam 47 will actuate the lever 44 and lever 42 to move the carriage along the rails 26 and 27. It will be further understood that by rotating the handle 56, the stem 55 will move the block 53 longitudinally of the guide bars 59 and will, through the medium of the connecting rod 52, arms 51 and 49, and link 48 change the relative position or fulcrum of the lever 42 so that a varied stroke of the carriage 28 and consequently the block 38 is thus attained to suit various requirements for different sized boxes as will be hereinafter more fully understood.

The frame 1 provides a support for a superstructure including two posts 65 and 66 which are arranged vertically adjacent the rear end of the frame 1 and support two longitudinally extending rods 67 and 68. The forward ends of these rods are mounted in an auxiliary frame 69, said auxiliary frame including two sides 70 and 71 which are spaced apart.

The rods 67 and 68 have bearings 72 mounted thereon, these bearings supporting a roll 73 of covering paper 75. A tank or tray 74 is also mounted on the rods 67 and provides a container for the adhesive solution necessary to coat the paper 75 after it passes off of the roll 73 and prior to its application to the boxes.

The tank 1 includes an adhesive-applying drum 76 which rotates within the adhesive in the tank 74 due to the frictional engagement of the paper 75 as the latter passes forwardly in a manner hereinafter described.

Clips 77 are designed to be sprung over the rear edge of the tank 74 and act as guides for the paper as it passes to the drum 76. A frame 78 is mounted directly over the tank 74 and includes rods 79 (see Figs. 1, 2, 3, 4, and 5) below which the paper passes after having received its adhesive from the drum 76.

The frame 78 is rockably mounted on the tank 74 and has an arm 80 secured thereto. A rod 81 connects the arm 80 with a handle 82, said rod 81 passing through a stud 83 on the side of the auxiliary frame 69. The angle of the frame 78 can thus be changed by pulling or pushing the rod 81, after which it can be secured in the desired position by means of a screw 84 in said stud.

The paper 75, after passing in contact with the frame 78, is relieved of any superfluous adhesive and passes forwardly over suitable guides 85 on the rod 67 to the paper applying means hereinafter described.

A paper applying and pressing roller 86 is rotatably mounted on a shaft 87 and is made in a number of sections 88. The opposite ends of the shaft 87 are mounted in two oppositely disposed arms 89. The rear ends of the arms 89 are secured to a rock shaft 90 mounted in the auxiliary frame 69. A lever 91 is secured at its upper end to the rock shaft 90 and at its lower end has an antifriction roller 92 thereon which is designed to be held in engagement with a cam 93, for a portion of its travel, by means of a spring 94, the latter being interposed between a link 95 which is connected to the lever 91 and an adjusting rod 96 which has a threaded end 97. Said end 97 extends through the rear end of the frame 1 and has a nut 98 thereon whereby the rod 96 can be adjusted longitudinally to increase or decrease the tension of the spring 94.

The lever 91 has a bracket 99 (see Fig. 17) secured thereto, said bracket including a stem 100 and a sleeve 101. The sleeve 101 forms a sliding bearing for a rod 102 which has a head 103 designed under certain conditions to be engaged by the adjacent end of the sleeve 101 to limit the extent of movement of the lever 91 by the spring 94, it being understood that as the cam 93 rotates, the spring 94 will tend to move the anti-friction roller 92 toward the low portion of the cam and that the resilient movement of the cam and spring 94 will serve to oscillate the arms 89 to raise and lower the roller 86 to press the paper on the box when the block 38 has moved the box thereunder.

The rod 102 extends to the front end of the frame 1 and is threaded to receive a nut 104 which can be rotated by means of a handle 105. It will be noted by reference to Fig. 17, that the stem 100 forms the connection for the link 95, thus forming a neat and practical attachment for the link 95, the lever 91 and the rod 102.

By the provision of the rod 102 and the head 103, the inward stroke of the lever 91 can be varied to suit different conditions as might occur from time to time and which need adjustment.

A bar 106 has one end pivotally connected to the lever 91 (see Figs. 1, 2, 5, and 16) and its other end extends through a plate 107, the lower end of said plate being pivoted at 108 to blocks 109 on the rear end of the frame 1. The inner portion of the plate 107 supports a rubber pad 109 designed to firmly engage and press the paper 75 against the rear surface 110 of the frame 1 so as to periodically hold the paper.

I provide the following means which are operative to keep a desirable amount of slack in the paper 75, so that there is practically no chance for the paper to tear or become injured. Furthermore, with my improved means for providing the slack, the paper is permitted to move under a uniform degree of tension at all times.

A rod 111 is pivotally connected to the block 57 at the lower end of the swinging carriage 54. This rod 111 has an adjustable cleat 112 thereon to which is pivoted a connecting link 113. This connecting link is pivotally connected to an arm 114 which is secured on a rock shaft 115. Arms 115ᵃ on shaft 115 support a slacking roller 116 which periodically moves into engagement with the paper 75 to draw the paper from the roll 73. This action on the paper by the roller 116 is very gentle and an advantage is attained by having the roll of paper 73 above the slacking roller 116, since by this construction the roller 116 applies a downward wiping action which is assisted by gravity to draw the proper amount of slack paper from said roll 73.

An elongated plate 117 has its ends bent rearwardly and pivoted at 118 to the oppositely disposed arms 89 (see Figs. 4, 5, 7, 8, and 10). This plate 117 has a transversely extending portion 119 which forms the base for a box 120 containing a packing 121 saturated with oil or other cleaning solution.

The top of the box 120 is provided with perforations 122 through which the oil or other solution can be supplied from time to time to the packing 121. A cover or lid 123 is provided to normally cover the perforations 122, this lid being pivoted to the plate 117 as shown at 124 (see Fig. 10). The box 120 also has holes 125 in its front and rear sides, the front holes being in register with the rear holes to permit a plurality of paper supporting needles 126 to extend therethrough and through the packing 121.

The needles 126 are adjustably clamped to a transversely extending bar 127 by bolts 128, said needles extending through the holes in the bolts so that when the bolts are tightened, the needles are firmly secured between the upper heads of the bolts and the transversely extending bar 127.

The bar 127 has two fingers 129 which are pivotally connected at their rear ends to the upper ends of two arms 130 which are made integral in the present instance with a rock bar 131 which is journaled in the auxiliary frame 69.

An arm 132 (see Fig. 5) is secured to the rock bar 131 and is designed to be oscillated by a disk 133 which is eccentrically and adjustably mounted on the lever 91. A standard 134 on the bed 3 of the frame 1 supports an adjustable rod 135 upon which is mounted a spring 136. The opposite ends of the spring 136 bear against a head 137, and the top end of the standard 134, so as to move the rod 135 longitudinally and thereby keep the arm 132 in contact with the disk 133, it being noted that as the lever 91 is oscillated in the manner above described, the disk 133 will oscillate the arm 132 and arms 130 to slide the needles 126 longitudinally so that their forward end portions will slide through the box 120 and packing 121.

The covering paper, as clearly shown in Figs. 7 and 8, extends above the needles 126 and below the pressure applying roller 86, the forward portion of the needles serving for a support for the front end of the paper when the roller 86 is raised and being retracted when the roller 86 is lowered to press the paper upon the box.

The forward end of the plate 117 (see Figs. 7, 10, and 15) is resiliently supported by a link 138 which is connected to a torsion spring 139 which is coiled upon a fixed bridge 140, said bridge in the present instance being secured to one side of the auxiliary frame 69. A pin 141 is secured within one of the arms 89 and is designed to bear against the top edge surface of the plate 117 so that as the arms 89 descend with the roller 86, the pin 141 will engage the plate 117 and move it down on its pivot 118 against the action of the spring 139.

A stop plate 142 has flanges 143 and 144 respectively at its top and bottom. The flange 143 is notched at 145 to receive and form a fixture for one end of the torsion spring 139. The flange 144 projects into the path of movement of the plate 117 and thereby limits the forward movement of said plate 117, the arms 89, and roller 86 being permitted to raise to a higher level to entirely clear the paper under certain conditions in the operation of the machine which will be hereinafter more fully described.

It will be understood, however, that the block 38 moves the box under the forward end of the paper and that the roller 86 descends to press the paper, which has been previously coated with adhesive, on the box and that as the box moves forward, the paper will be drawn a sufficient distance to supply the covering sheet for the box after which the paper will be automatically cut by mechanism which I will now describe.

A cam 146 is secured to one end of the cam shaft 25. An anti-friction roller 147 is mounted on an arm 148, the latter being secured to a rock shaft 149 journaled in the frame 1. The roller 147 is normally held in engagement with the cam 146 by a spring 150, said spring being attached to an adjustable hook 151 in a bracket 152 which depends from the bottom of the frame 1.

A link 153 pivotally connects the arm 148 with a crank arm 154. This crank arm is secured to a shaft 155 to which is fixed another crank arm 156. The arm 156 is pivotally connected by a link 157 to one of two knife-carrying arms 158. These arms are secured to a rock shaft 159 in the auxiliary frame 69, and at their forward free ends support a movable cutting blade 160. This blade is removably connected to said arms by means of bolts 161 and is designed to engage with another cutting blade 162 which is supported on the auxiliary frame 69 in front of the path of movement of the paper applying roller 86.

As clearly shown in Figs. 7, 8, and 18, the cutting blade 162 is secured to a transversely extending bar 163 which is pivotally mounted at its opposite ends in the opposite sides of the auxiliary frame 69, the position of said pivot being illustrated at 164 Fig. 8.

The bar 163 has an upwardly extending tongue 165 through which extends a pin 166. This pin at its outer end is screw-threaded and provided with a nut 167. Another nut 168 is secured to said pin, and interposed between this nut 168 and the tongue 165 is a spring 169, it being noted that the pin 166 is free to slide through the tongue 165.

A casing 170 has a plunger 171 therein which is backed by a spring 172. This plunger forms a buffer for the knife-carrying arms 158, since it will be noted that it is the action of the spring 156 upon the arm 148 which moves the arms 158 and cutting blade 160 upwardly to cut the paper when the anti-friction roller 147 drops off of the high point of the cam 146 as clearly illustrated in Fig. 2.

The pin 166 above noted is secured to the casing 170 so that as the cutting blade 160 on the arms 158 is raised into cutting engagement with the cutting blade 162, the bar 163 which carries the blade 162 will be free to rock against the pressure of the spring 169. In other words, the blade 162 can rock slightly on the pivot 164 upon the initial impact of the blade 160 with the cutting portion of the blade 162 thus preventing injury to the cutting edges and causing the cutting edges of the blades to closely hug each other throughout their entire lengths.

The blade 162 is secured to the bar 163 by bolts 173 and adjusting screws 174 extend through tapped holes in the bar 163 and engage the inner surface of the blade 162, thus by loosening the nuts of the bolts 173 and tightening on the adjusting screws 174, the cutting edge of the blade 162 can be slightly altered to suit conditions of wear.

Figure 2:
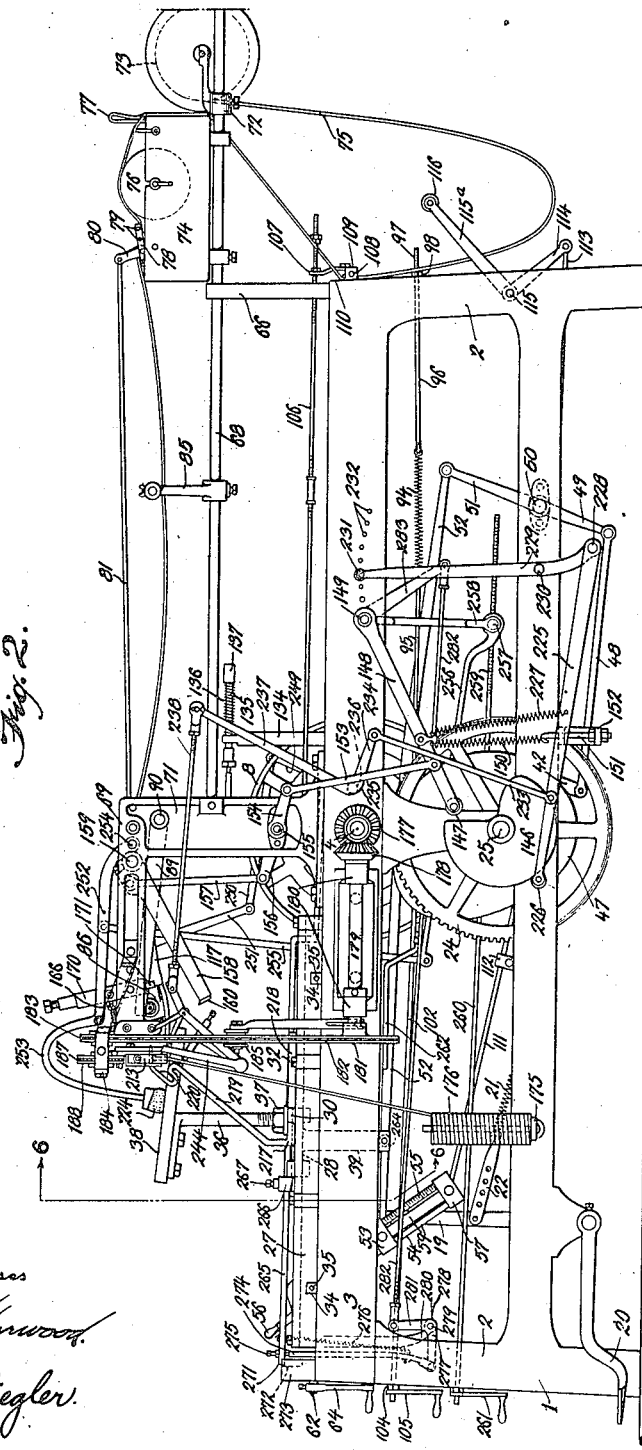
Fig. 2 is an elevation of the opposite side of the machine shown in Fig. 1.
Figure 6:
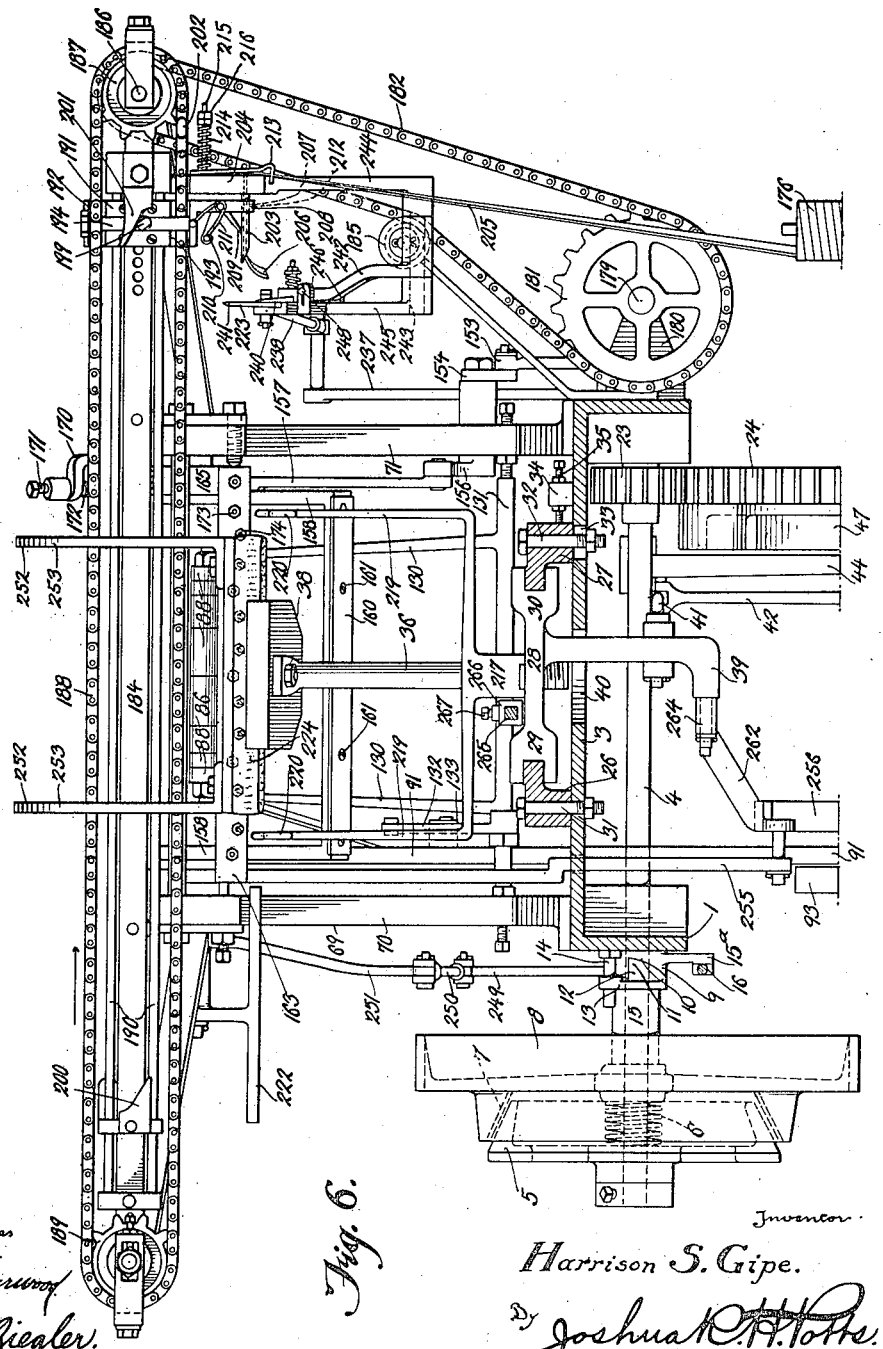
Fig. 6 is an enlarged sectional end elevation on the line 6—6 of Fig. 2.
Figure 9:
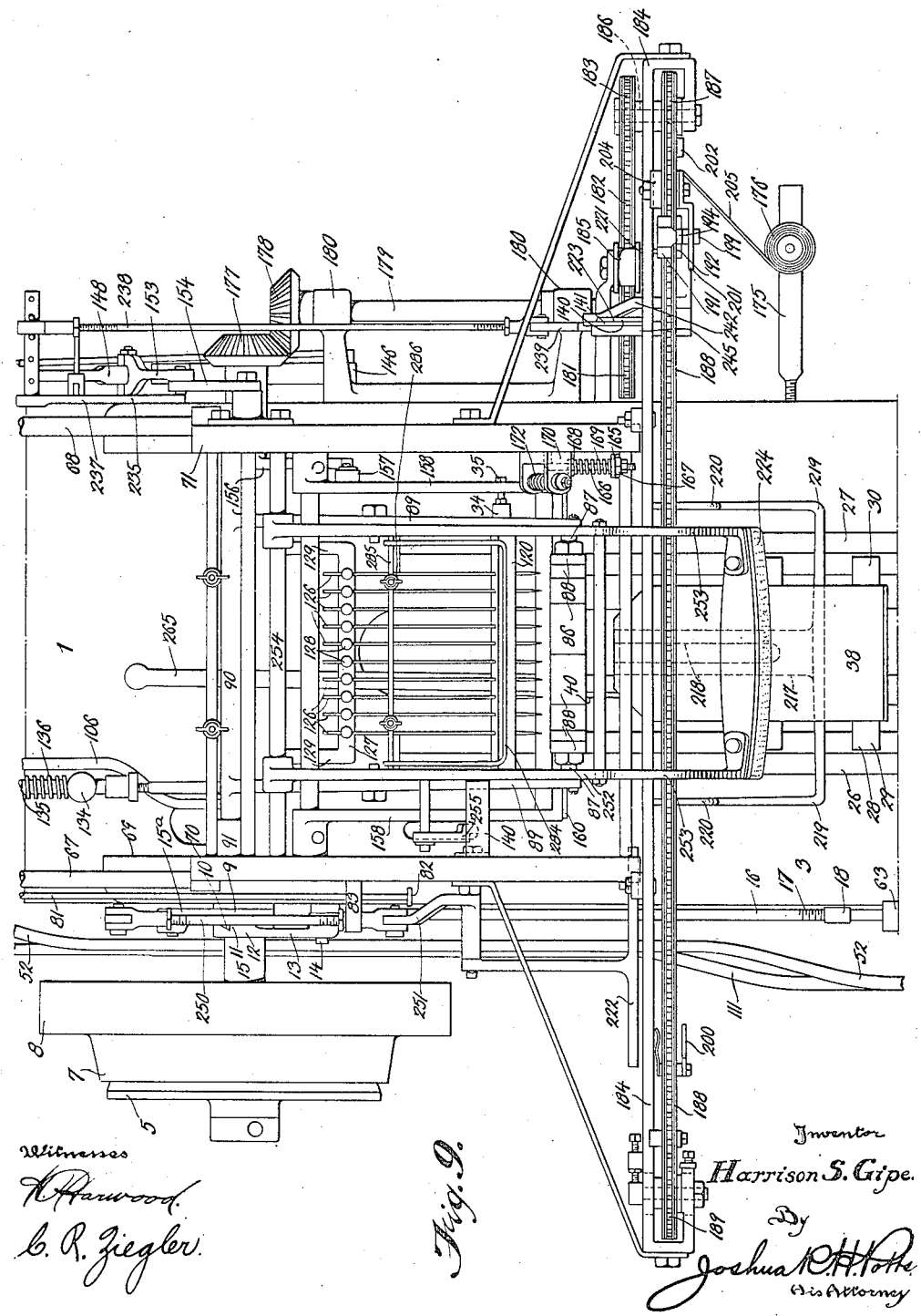
Fig. 9 is an enlarged fragmentary top plan view of a portion of my improved machine adjacent the front thereof.

A bar 175 forms the support for a spool of tape 176 which is fixed to the boxes between the covering sheet by the following means:

Referring particularly to Figs. 2, 6, and 9, the main driving shaft has a beveled gear 177 which meshes with another beveled gear 178 on a shaft 179 which is journaled in a bearing 180, the latter being secured to one side of the frame 1. This shaft has a sprocket wheel 181 which drives a chain 182 passing around another sprocket wheel 183 mounted in a suitable bearing 184 secured to the auxiliary frame 69, a double flanged idler pulley 185 being provided to take up the slack in said chain 182.

The sprocket 183 drives a shaft 186 to which is secured another sprocket 187. A shuttle-conveying chain 188 connects the sprocket 187 with another sprocket 189 on the opposite side of the machine, said chain 188 extending transversely of the machine adjacent its front as clearly shown in Fig. 6. The bearing 184 includes two guide rods 190 which are spaced apart and form slidable bearings for a shuttle 191. This shuttle has openings 192 and 193 through which the opposite runs of the chain 188 pass (see also Figs. 11, 12, 13, and 14).

The shuttle 191 carries a slidable plate 194, the rear face of which is provided with two recesses 195 and 196 into which a metallic ball 197 is designed to be pressed by a spring 198 when the plate 194 is raised and lowered by means hereinafter described.

The plate 194 on its outer face has a lug 199 which is arranged at an angle and designed to engage a raising cam 200 when the shuttle is moved in one direction and to engage a lowering cam 201 when the shuttle is moved in an opposite direction. The shuttle is moved backwardly and forwardly by an outwardly projecting link 202 on the chain 188 by the alternate engagement of this link with opposite ends of the plate 194. For example, as shown in Fig. 6, the plate 194 is shown in a lowered position having been lowered by the cam 201 and in the path of movement of the projecting link 202 so that when the chain moves in the direction of the arrow, the link 202 will engage the lower end of the plate 194 and convey the shuttle across the machine until the lug 199 engages the raising cam 200, when the plate will be raised until its lower end has freed the link 202 and the upper end of the plate 194 will be projected into the path of the link 202 when said link turns around the sprocket 189 and travels in a transverse direction across the machine, it being noted that when the raising cam 200 lifts the plate 194, the lower end of the latter will be freed of the link 202, and the link 202 will be free to pass under it and around said sprocket 189.

When the link 202 reaches the upper run of the chain 188, it will engage the upper end of the plate 194 and thereby carry the shuttle in a reverse direction across the machine until the lug 199 again engages the lowering cam 201 and the operation is again repeated.

It will be noted that the spring 198 acts with sufficient pressure to hold the ball into engagement with either of the recesses 195 and 196 in the plate 194 so that said plate cannot be accidentally raised or lowered, thus insuring a positive movement of the shuttle backward and forward across the machine.

A tube 203 is secured in an adjustable block 204 of the bearing 184, and the tape 205 from the spool 176 extends through said tube 203 as clearly shown in Fig. 6. The tube 203 at its free end is beveled on its bottom to allow the end portion 206 of the tape to hang below a plane including the lowest portion of the tube 203 for a purpose now to be described.

The tube 203 extends through an opening 207 in a depending portion 208 of the shuttle 191 when the shuttle is in a position ready to move forward to carry the tape across the machine and above the top of the box to which the covering paper is to be applied. This position is clearly shown in Figs. 6 and 12.

A tape gripping finger 209 is pivotally mounted within the opening 207 and has an arm 210 which is actuated by a spring 211 to move the tape gripping finger 209 toward the surface 212 which forms the bottom of the opening 207. It will be understood that when the depending portion 208 of the shuttle 191 is moved over the tube 203, the tape gripping finger 209 will be raised against the action of its spring 211 and will frictionally bear on the top surface of the tube 203. However, the spring 211 tends to move the tape gripping finger downwardly as above described so that when the shuttle 191 is moved forwardly a sufficient distance for the lower end of the tape gripping finger 209 to clear the free end of the tube 203, the spring 211 will turn the finger 209 on its pivot and will clamp the end 206 of the tape between it and said surface 212 of the shuttle. This gripping pressure is sufficient to pull the tape across the box, and to insure proper tension on the tape, I provide a plate 213 (see Fig. 6) for engagement with the tape, the degree of tension on the tape being regulated by a spring 214 mounted on a rod 215, said rod having a threaded portion and being provided with nuts 216 whereby the pressure of said spring on the plate can be varied.

A plate 217 is mounted on the carriage 28, the post 36 extending through the space between two prongs 218 on said plate 217, the nut 37 on said post being operative to adjustably clamp said latter plate to the carriage.

The plate 217 has two fingers 219 which extend upwardly and at an incline rearwardly. These fingers are included in planes located at either side of the block 38, and at their upper ends have angular portions 220 which extend downwardly from a position above a plane including the top of the box while on the block 38 and extend downwardly to a position below the plane including the top of the box while on the block 38. The function of the hooked portions of the fingers 219 is to engage the tape while stretched across and above the box and, by the movement of the carriage and the engagement of the tape with the angular portions 220, to move the tape downwardly and firmly place it across the top of the box.

The arm 210 of the tape gripping finger 209 has a pin 221 which is designed to be raised by a knocking-off lever 222 by an action hereinafter explained, and simultaneous to this engagement of the pin 221 with the lever 222, tape cutting shears 223 will be actuated to cut the tape, it being noted that the paper covering is applied directly over the tape and pressed by the roller 86 during the movement of the carriage, and that the cutting blade 160 is raised to shear the covering paper at the proper moment in the timing of the machine.

After the paper has been pressed onto the box by the roller 86 and has started its outward movement, a wiping pad 224 is moved downwardly to engage the outer surface of the paper and smooth the latter of any irregularities. The elements which actuate the pad 224 will be described hereinafter.

The construction of the tape cutting shears and the elements which operate them will now be described.

An arm 225 has an anti-friction roller 226 which is held in engagement with the cam 146 (see Fig. 2) by a spring 227. The arm 225 is pivoted at 228 to the lower end of a lever 229, said lever 229 between its ends being pivoted to the frame 1 as shown at 230. The upper end of the lever 229 has a pin 231 which is designed to engage in one of a row of holes 232 formed in the side of the frame 1. The holes 232 are arranged in the arc of a circle having its center at the center of the pivot 230 of the lever 229 so that by changing the pin from one hole 232 to another hole in the same row, the position of the pivotal connection 228 of the arm 225 will be changed to vary the position of the anti-friction roller 226 with respect to the cam 146, and thus vary the timing of the tape cutting shears 203.

The arm 225 is connected by a link 233 to an arm 234 of a bell-crank-lever 235, said bell-crank-lever being mounted on a rock shaft 236 in frame 1. The other arm 237 of said latter bell-crank-lever is pivotally attached to a connecting rod 238 (see Figs. 2 and 8).

The opposite end of the connecting rod 238 is pivotally secured to an extension 239 having one blade 240 of the shears 223 secured thereto. The other blade 241 of said shears is pivotally connected to the blade 240 and to an arm 242 which is pivoted at 243 to a fixed member 244 which depends from the bearing 184 which, as will be remembered, is secured to the auxiliary frame 69.

A T-shaped bar 245 is relatively fixed to the member 244 and has ears 246 at the opposite ends of its head 247. Threaded tap bolts 248 are screwed into the ears 246 and have their ends oppositely disposed and designed to be abutted by the arm 242 during its oscillation on the pivot 243, thus limiting the pivotal movement of said arm 242 in opposite directions.

It will thus be noted that by the action of the spring 227 and the cam 146, the shears 223 will be pushed into the path of the tape and a continued movement of said shears will bring the blades 240 and 241 together to cut the tape. Simultaneous with this action, the knocking-off lever 222 will be raised to lift the pin and thereby release the tape gripping finger 209 to free the end 206 of the tape.

The mechanism for moving the knocking-off lever 222 is as follows:

The opposite end of the rock shaft 236 has a crank arm 249 secured thereto, and this arm is pivotally connected by a link 250 with an arm 251, the latter being pivotally mounted on one side of the auxiliary frame 69 and is secured to the knocking-off lever 222. It will thus be seen that the movement of the rock shaft 236 will operate the shears 223 and raise the knocking-off lever 232 to release the tape.

The wiping pad 224 is actuated by the following mechanism:

Arms 252 have their forward end 253 bent upwardly to pass over the sprocket chains and coöperative parts above described, and at their lower ends have the pad 222 secured thereto. The arms 252 at their rear ends are pivoted on a rod 254 which extends transversely between the sides of the auxiliary frame 69. A lifting rod 255 at its upper end is pivotally connected to one of the arms 252 and at its lower end is pivotally connected to a lever 256.

The lever 256 is pivoted on a rod 257 suspended at the bottom of a pendant link 258, said link being freely hung on the shaft 149. The rod 257 has a screw-threaded hole through which extends the screw-threaded end 259 of an adjusting rod 260. This rod 260 extends to the forward end of the machine and has a handle 261 secured thereto so that by turning the handle 261, the pendant link 258 will be swung either forwardly or rearwardly to impart a longitudinal movement to the lever 256.

The lever 256 at its forward end has an upturned portion 262 for a purpose hereinafter described. The cam shaft 25 has a cam 263 thereon which when rotated, acts to lift the lever 256 and with it the portion 262 to raise the pad 224 through the medium of the lifting rod 255 and the arm 252. The portion 262 is thereby moved above the plane of movement of an anti-friction roller 264 which depends from carriage 28. The cam 263 then moves away from the lever 256, but the pad 224 remains elevated for the reason that the portion 262 is resting upon the roller 264 during a portion of the movement of the carriage 28 and block 38.

On the outward movement of the carriage 28, the roller 264 will pass from under the portion 262 of the lever 256 and the latter will fall and with it the pad 224 to wipe the paper upon the box for the purpose above noted.

It will be understood that when the cutting blade 160 is operated to sever the covering paper after the proper amount has been delivered to the box, which is being covered, that the carriage 28 must stop to give sufficient time for the cutting of the paper. By providing the means previously described for actuating the carriage 28, I am enabled to stop the forward movement of the carriage for the purpose of permitting the cutting of the paper as just described, and I have illustrated the following mechanism for automatically stopping and releasing the carriage.

A graduated bar 265 is positioned above the bed of the table and upon this bar is adjustably secured a dog 266. This dog can be secured by means of a set screw 267 at various positions along the graduated bar 265 and when lowered into the path of movement of the carriage 28, will stop the carriage as will be more clearly understood from the following description.

The rear end of the bar 265 has a rod 268 which extends downwardly and freely through a hole in the top of the bed 3 of the frame 1. The lower end of the rod 268 has a nut 269 thereon and between this nut and the top of the bed 3, is positioned a spring 270. The bar 265 extends over the carriage at a slight angle downwardly toward the rear, so that during the inward movement of the carriage, the carriage frictionally engages the under surface of the graduated bar 265 and the latter thus acts as a retarding means to gradually retard the inward movement of the carriage, the spring 270 being compressed when the bar 265 is slightly raised by the frictional engagement of the carriage.

The forward end 271 of the bar 265 is designed, when lowered, to enter a notch 272 in a block 273 mounted on the upper surface of the bed 3 so that when said end 271 of the bar 265 is lowered, it can abut the innermost wall of said notch when the carriage 28 strikes and is stopped by the dog 266.

The means for raising and lowering the forward end of the bar 265 consists of a lifting rod 274, the top of which engages the lower end of an adjusting screw 275 mounted on the forward end of said bar 265. The lower end of the rod 274 is pivotally connected to one arm 277 of a bell-crank-lever 278, the latter being pivotally mounted at 279 to a bracket 280 which is secured to the frame 1. The other arm 281 of said bell-crank-lever 278 is pivotally connected to one end of a connecting rod 282, the latter at its rear end being pivotally connected to an arm 283 secured to the shaft 149. A spring 276 is connected to the raising rod 274 and to the bar 265 to hold the adjusting screw 275 into engagement with the top of said rod 274.

It will thus be understood that when the anti-friction roller 147 on the arm 148 drops off of the cam 146 to effect the cutting of the paper as above described, the shaft 149 will be rocked and the arm 283 will be oscillated to effect the raising of the forward end of the graduated bar 265 to lift the dog 266 out of the path of the carriage 28 to permit the movement of the latter.

The bar 265 is graduated as clearly shown in Fig. 1, so that by securing the dog 266 at any of the graduations, the carriage can be caused to stop at any desired position.

It will be understood that the paper 75 will be supported on the forward ends of the needles 126 and that by moving the needles longitudinally as previously described, they will be kept free from the adhesive. By providing the spring connection between the arms 89 and the plate 117 which carries the box 120, a resilient support is provided for said box and for the paper passing thereover.

To prevent the accidental raising of the paper off of the needles and box 120, I provide a pressure device 284 which consists of a wire frame which is pivoted on a transversely extending rod 285 which is supported on the plate 117. The rod 285 has adjustable guides 286 thereon which may be slid longitudinally of the bar 285 by loosening the nuts 287. The lower ends 288 of the guides 286 being spaced apart, form a guideway for the paper which passes under the rod 285.

It will be understood that the block 38 serves as a form for the boxes which are placed thereon by the operator, and when the treadle 20 is depressed by the operator, the several parts will operate to move the form inwardly to receive the covering sheet and tape and will again move outwardly toward the front end of the machine so that the covered box can be readily removed by the operator.

The parts are adjustable by means previously described, thus boxes of various lengths and widths can be covered on my improved machine.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. In a box covering machine, a carriage, a box-supporting member thereon, actuating means including two levers pivoted together, and means for changing the fulcrum of one of the levers whereby the extent of movement of the carriage is varied, substantially as described.

2. In a box covering machine, a carriage, a box-supporting member thereon, movable means, a pivoted lever operated by said means, a second lever pivoted to the first lever, means operatively connecting the second lever with the carriage, and means for moving said second lever whereby its extent of movement by the first lever is varied to vary the extent of movement of said carriage, substantially as described.

3. In a box covering machine, a carriage, a box-supporting member thereon, a cam, a supporting structure, a lever free to oscillate on said supporting structure and actuated by the cam, a second lever pivoted to said first lever, means operatively connecting the second lever with the carriage, and means for changing the position of said second lever relatively to the first lever whereby the extent of movement of said carriage is varied, substantially as described.

4. In a box covering machine, a carriage, a box-supporting member thereon, a cam, a supporting structure, a lever free to oscillate on said supporting structure, a roller on said lever actuated by said cam to oscillate said lever, a second lever pivoted to the first lever, a link operatively connecting the second lever to move the carriage, and means for changing the pivotal relation of said second lever to the first lever whereby the extent of movement of the carriage is varied, substantially as described.

5. In a box covering machine, a carriage, a box-supporting member thereon, a cam, a supporting structure, a lever pivoted on said supporting structure, a second lever pivoted on said first lever, and means on said first lever for engagement with said cam whereby said first lever is oscillated, means operatively connecting the second lever with the carriage, and means for rocking the second lever on its pivot whereby the extent of movement of said second lever relatively to the first lever is varied and the extent of movement of said carriage is varied, substantially as described.

6. In a box covering machine, a carriage, a box-supporting member thereon, a cam, a supporting structure, a lever pivoted on said supporting structure, a second lever pivoted within its length to said first lever, means on said first lever for engagement with said cam whereby said first lever is oscillated, means operatively connecting one end of said second lever with the carriage, and means for rocking the second lever on its pivot whereby the extent of movement of said second lever relatively to the first lever is varied and the extent of movement of said carriage is varied, substantially as described.

7. In a box covering machine, a carriage, a box-supporting member thereon, a cam, a supporting structure, a lever pivoted on said supporting structure, a second lever pivoted within its length to said first lever, means on said first lever for engagement with said cam whereby said first lever is oscillated, means operatively connecting one end of said second lever with the carriage, and means operatively connected to the opposite end of said second lever to rock the said second lever on its pivot whereby the extent of movement of said second lever relatively to the first lever is varied and the extent of movement of said carriage is varied, substantially as described.

8. In a box covering machine, a carriage, a box-supporting member thereon, a cam, a supporting structure, a lever pivoted on said supporting structure, a second lever pivoted within its length to said first lever, means on said first lever for engagement with said cam whereby said first lever is oscillated, means operatively connecting one end of said second lever with the carriage, a swinging carriage, a block movable on said carriage, and means operatively connecting said block with the opposite end of said second lever whereby said second lever is moved on its pivot when the block is adjusted on said carriage, substantially as described.

9. In a box covering machine, a carriage, a box-supporting member thereon, a cam, a supporting structure, a lever pivoted on said supporting structure, a second lever pivoted within its length to said first lever, means on said first lever for engagement with said cam whereby said first lever is oscillated, means operatively connecting one end of said second lever with the carriage, a swinging carriage, a block movable on said carriage, a rock shaft on said supporting structure, arms on said rock shaft, a link pivotally connecting one of the arms to the opposite end of said second lever, and a connecting rod pivotally connecting the other of said arms with said block on the swinging carriage, substantially as described.

10. In a box covering machine, a carriage a box-supporting member thereon, a cam, a supporting structure, a lever pivoted on said supporting structure, a second lever pivoted within its length to said first lever, means on said first lever for engagement with said cam whereby said first lever is oscillated, means operatively connecting one end of said second lever with the carriage, a swinging carriage, a block movable on said carriage, a rock shaft on said supporting structure, arms on said rock shaft, a link pivotally connecting one of the arms to the opposite end of said second lever, a connecting rod pivotally connecting the other of said arms with said block on the swinging carriage, a threaded stem on said swinging carriage, said block having a threaded opening into which said stem fits, and means for turning said stem whereby the block is moved longitudinally of said stem, substantially as described.

11. In a box covering machine, a carriage, a box-supporting member thereon, a cam, a supporting structure, a lever pivoted on said supporting structure, a second lever pivoted within its length to said first lever, means on said first lever for engagement with said cam whereby said first lever is oscillated, means operatively connecting one end of said second lever with the carriage, a swinging carriage, a block movable on said carriage, a rock shaft on said supporting structure, arms on said rock shaft, a link pivotally connecting one of the arms to the opposite end of said second lever, a connecting rod pivotally connecting the other of said arms with said block on the swinging carriage, a threaded stem on said swinging carriage, said block having a threaded opening into which said stem fits, means for turning said stem whereby the block is moved longitudinally of said stem, and means for moving said swinging carriage independently of its pivotal movement, substantially as described.

12. In a box covering machine, a carriage, a box-supporting member thereon, a cam, a supporting structure, a lever pivoted on said supporting structure, a second lever pivoted within its length to said first lever, means on said first lever for engagement with said cam whereby said first lever is oscillated, means operatively connecting one end of said second lever with the carriage, a swinging carriage, a block movable on said carriage, a rock shaft on said supporting structure, arms on said rock shaft, a link pivotally connecting one of the arms to the opposite end of said second lever, a connecting rod pivotally connecting the other of said arms with said block on the swinging carriage, a threaded stem on said swinging carriage, said block having a threaded opening into which said stem fits, means for turning said stem whereby the block is moved longitudinally of said stem, a threaded shaft on said supporting structure, a member supporting said swinging frame and having a threaded opening fitting said threaded shaft, and means for rotating said threaded shaft whereby said member is movable to actuate said swinging frame independently of its pivotal movement, substantially as described.

13. In a box covering machine, a carriage, means for moving the carriage to various extents, a box support on the carriage, means for applying an adhesive coated sheet of paper to the box while on said support, means for conveying tape across the path of movement of said box support, and fingers movable in conjunction with said box support, said fingers having angular portions for engagement with and serving to deflect the tape and press it against said box on the support, substantially as described.

14. In a box covering machine, a carriage, means for moving the carriage to various extents, a box support on the carriage, means for applying an adhesive coated sheet of paper to the box while on said support, means for conveying tape across the path of movement of said box support, and fingers movable in conjunction with said box support, said fingers having angular portions extending from a position above the top of the box while on said support to a level which is below said top of the box whereby the tape is moved downwardly and into firm engagement with the top of the box, substantially as described.

15. In a box covering machine, a carriage, means for moving the carriage to various extents, a box support on the carriage, means for applying an adhesive coated sheet of paper to the box while on said support, means for conveying tape across the path of movement of said box support, fingers movable in conjunction with said box support, said fingers having angular portions extending from a position above the top of the box while on said support to a level which is below said top of the box whereby the tape is moved downwardly and into firm engagement with the top of the box, and means for adjusting the position of said fingers relatively to the box whereby the tape may be applied at different positions throughout the length of the box, substantially as described.

16. In a box covering machine, a carriage, means for moving the carriage to various extents, a box support on the carriage, means for applying an adhesive coated sheet of paper to the box while on said support, means for conveying tape across the path of movement of said box support, fingers movable in conjunction with said box support, said fingers having angular portions extending from a position above the top of the box while on said support to a level which is below said top of the box whereby the tape is moved downwardly and into firm engagement with the top of the box, said fingers having a forked lower portion, a threaded post connecting said box support with the carriage and extending between the forked portion of the fingers, and a nut on said post whereby the forked portion of the fingers is adjustably secured to the carriage, substantially as described.

17. In a box covering machine, a movable carriage, means for moving the carriage to various extents, a box supporting member thereon, means for applying an adhesive coated sheet to the box on said supporting member, a wiping pad, a lifting rod operatively connected to the wiping pad, a lever, a cam for raising said lever to raise the pad, means on said carriage for holding the lever in a raised position independently of the cam, said latter means being movable out of engagement with said lever to permit the pad to fall onto the covering sheet on the box during a portion of the movement of said carriage, substantially as described.

18. In a box covering machine, a movable carriage, means for moving the carriage to various extents, a box supporting member thereon, means for applying an adhesive coated sheet to the box on said supporting member, a wiping pad, a lifting rod operatively connected to the wiping pad, a lever, a cam for raising said lever to raise the pad, an anti-friction roller operatively connected to said carriage and movable under a portion of said lever when the latter is raised, said anti-friction roller serving to hold the lever and consequently the pad in a raised position during a portion of the movement of said carriage, said anti-friction roller being movable out of engagement with said lever to permit the latter to fall and with it the pad so as to engage the covering sheet on the box, substantially as described.

19. In a box covering machine, a movable carriage, means for moving the carriage to various extents, a box supporting member thereon, means for applying an adhesive coated sheet to the box on said supporting member, a wiping pad, a lifting rod operatively connected to the wiping pad, a lever, a cam for raising said lever to raise the pad, means on said carriage for holding the lever in a raised position independently of the cam, said latter means being movable out of engagement with said lever to permit the pad to fall onto the covering sheet on the box during a portion of the movement of said carriage, and adjusting means for moving said lever longitudinally, substantially as described.

20. In a box covering machine, a movable carriage, means for moving the carriage to various extents, a box supporting member thereon, means for applying an adhesive coated sheet to the box on said supporting member, a wiping pad, a lifting rod operatively connected to the wiping pad, a lever, a cam for raising said lever to raise the pad, means on said carriage for holding the lever in a raised position independently of the cam, said latter means being movable out of engagement with said lever to permit the pad to fall onto the covering sheet on the box during a portion of the movement of said carriage, a pendant link, a rod carried by said pendant link and having a threaded opening, an adjusting rod having a threaded portion engaging said opening, and means for rotating the adjusting rod whereby the pendant link is swung and the lever is moved longitudinally, substantially as described.

21. A box covering machine including a carriage, a box support movable by said carriage, arms spaced apart, a roller carried by said arms, a plate pivotally supported on said arms, needles supported by said plate, resilient means supporting said plate independently of the arms, and means for moving said arms whereby the roller is raised and lowered into and out of contact with the box, substantially as described.

22. A box covering machine including a carriage, a box support movable by said carriage, arms spaced apart, a roller carried by said arms, a plate pivotally supported on said arms, needles supported by said plate, a supporting structure, a spring on the supporting structure and connected to said plate, means on said arms for limiting the pivotal movement of said plate relatively to the arms by the action of said spring, and means for moving said arms whereby the roller is raised and lowered into and out of contact with the box, substantially as described.

23. A box covering machine including a carriage, a box support movable by said carriage, arms spaced apart, a roller carried by said arms, a plate pivotally supported on said arms, needles supported by said plate, a supporting structure, a spring on the supporting structure and connected to said plate, means on said arms for limiting the pivotal movement of said plate relatively to the arms by the action of said spring, means for moving said arms whereby the roller is raised and lowered into and out of contact with the box, a stop on said supporting structure for limiting the movement of the plate when the arms are moved upwardly, substantially as described.

24. A box covering machine including a carriage, a box support movable by said carriage, arms spaced apart, a roller carried by said arms, a plate pivotally supported on said arms, needles supported by said plate, a supporting structure, a spring on the supporting structure and connected to said plate, means on said arms for limiting the pivotal movement of said plate relatively to the arms by the action of said spring, means for moving said arms whereby the roller is raised and lowered into and out of contact with the box, a stop on said supporting structure for limiting the movement of the plate when the arms are moved upwardly, and means for moving the needles under the roller when the latter is raised, substantially as described.

25. A box covering machine including a carriage, a box support movable by said carriage, arms spaced apart, a roller carried by said arms, a plate pivotally supported on said arms, a box carried by said plate, needles slidable through said box, cleaning material for the needles located in said box, said box being perforated to permit lubricant to be supplied to said cleaning material, and a cover on said box for closing said perforations, substantially as described.

26. A box covering machine including a carriage, a box support movable by said carriage, arms spaced apart, a roller carried by said arms, a plate pivotally supported on said arms, needles supported by said plate, resilient means supporting said plate independently of the arms, means for moving said arms whereby the roller is raised and lowered into and out of contact with the box, a rod carried by said plate, and a frame pivotally mounted on said rod and designed to rest upon the top of the covering paper, substantially as described.

27. A box covering machine including a carriage, a box support movable by said carriage, arms spaced apart, a roller carried by said arms, a plate pivotally supported on said arms, needles supported by said plate, resilient means supporting said plate independently of the arms, means for moving said arms whereby the roller is raised and lowered into and out of contact with the box, a rod carried by said plate, and guides adjustably mounted on said rod, substantially as described.

28. A box covering machine including a carriage, a box support movable by said carriage, arms spaced apart, a roller carried by said arms, a plate pivotally supported on said arms, needles supported by said plate, a supporting structure, a spring on the supporting structure and connected to said plate, means on said arms for limiting the pivotal movement of said plate relatively to the arms by the action of said spring, means for moving said arms whereby the roller is raised and lowered into and out of contact with the box, a stop on said supporting structure for limiting the movement of the plate when the arms are moved upwardly, a rock bar, arms on said rock bar and operatively connected to said needles, and means for operating said rock bar whereby the needles are moved longitudinally, substantially as described.

29. A box covering machine including a carriage, a box support movable by said carriage, arms spaced apart, a roller carried by said arms, a plate pivotally supported on said arms, needles supported by said plate, a supporting structure, a spring on the supporting structure and connected to said plate, means on said arms for limiting the pivotal movement of said plate relatively to the arms by the action of said spring, means for moving said arms whereby the roller is raised and lowered into and out of contact with the box, a stop on said supporting structure for limiting the movement of the plate when the arms are moved upwardly, a rock bar, arms on said rock bar and operatively connected to said needles, an arm on said rock bar, a lever having an adjustable member thereon, means for moving said lever to move said adjustable member into engagement with said latter arm to effect the longitudinal movement of the needles, substantially as described.

30. A box covering machine including a carriage, a box support movable by said carriage, arms spaced apart, a roller carried by said arms, a plate pivotally supported on said arms, needles supported by said plate, a supporting structure, a spring on the supporting structure and connected to said plate, means on said arms for limiting the pivotal movement of said plate relatively to the arms by the action of said spring, means for moving said arms whereby the roller is raised and lowered into and out of contact with the box, a stop on said supporting structure for limiting the movement of the plate when the arms are moved upwardly, a rock bar, arms on said rock bar and operatively connected to said needles, an arm on said rock bar, a lever operatively connected to said first arms and having an adjustable member thereon, means for moving said lever to move said adjustable member into engagement with said arm to effect the longitudinal movement of the needles and to move said first arms to actuate the roller, substantially as described.

31. A box covering machine including a carriage, a box support movable by said carriage, arms spaced apart, a roller carried by said arms, a plate pivotally supported on said arms, needles supported by said plate, a supporting structure, a spring on the supporting structure and connected to said plate, means on said arms for limiting the pivotal movement of said plate relatively to the arms by the action of said spring, means for moving said arms whereby the roller is raised and lowered into and out of contact with the box, a stop on said supporting structure for limiting the movement of the plate when the arms are moved upwardly, a rock bar, arms on said rock bar and operatively connected to said needles, an arm on said rock bar, a lever having an adjustable member thereon, means for moving said lever to move said adjustable member into engagement with said latter arm to effect the longitudinal movement of the needles, and resilient means for holding said arm into engagement with said member, substantially as described.

32. A box covering machine including a carriage, means for moving the carriage to various extents, a box support movable by said carriage, a supporting structure, means for applying a strip of adhesive coated paper to the box, a cutting blade mounted on said supporting structure, arms pivotally mounted on said supporting structure, a knife carried by said arms, crank arms operatively connected to said knife-carrying arms, a cam, an arm engaged by said cam, a link connecting said crank arms with the latter mentioned arm, and a spring for moving said latter arm when released from the cam to effect the movement of the knife on said knife-carrying arms into engagement with the first-mentioned cutting blade to shear the paper, substantially as described.

33. A box covering machine including a carriage, means for moving the carriage to various extents, a box support movable by said carriage, a supporting structure, means for applying a strip of adhesive coated paper to the box, a cutting blade mounted on said supporting structure, arms pivotally mounted on said supporting structure, a knife carried by said arms, means for actuating said knife-carrying arms to move the latter mentioned knife into cutting engagement with said cutting blade, and a buffer for said knife-carrying arms, substantially as described.

34. A box covering machine including a carriage, means for moving the carriage to various extents, a box support movable by said carriage, a supporting structure, means for applying a strip of adhesive coated paper to the box, a cutting blade mounted on said supporting structure, arms pivotally mounted on said supporting structure, a knife carried by said arms, means for actuating said knife-carrying arms to move the latter mentioned knife into cutting engagement with said cutting blade, and resilient means for moving and keeping the cutting edge of said first cutting blade in the path of movement of the knife on said knife-carrying arms, substantially as described.

35. A box covering machine including a carriage, a box support movable by said carriage, a supporting structure, means for applying a strip of adhesive coated paper to the box, a gage bar, a dog adjustably mounted on said gage bar, and means for moving the dog into and out of the path of movement of said carriage whereby said carriage is stopped when the dog is moved into the path thereof, substantially as described.

36. A box covering machine including a carriage, a box support movable by said carriage, a supporting structure, means for applying a strip of adhesive coated paper to the box, a gage bar, a dog adjustably mounted on said gage bar, said supporting structure having a notch therein, means for moving said gage bar into and out of said notch and to move said dog into and out of the path of movement of said carriage whereby said carriage is stopped when the dog is moved into the path thereof and the gage bar is moved into the notch in the supporting structure, substantially as described.

37. A box covering machine including a carriage, a box support movable by said carriage, a supporting structure, means for applying a strip of adhesive coated paper to the box, a gage bar, a dog adjustably mounted on said gage bar, said supporting structure having a notch therein, a lifting rod connected to said gage bar, a bell-crank-lever operatively connected to said lifting rod, a rod connected to said bell-crank-lever, a rock shaft, an arm on said rock shaft connected to said latter rod, a second arm on the rock shaft, a cam for engagement with said second rod, and resilient means for holding said latter arm into engagement with said cam and for moving it when released by the cam, substantially as described.

38. A box covering machine including a carriage, a box support movable by said carriage, a supporting structure, means for applying a strip of adhesive coated paper to the box, a tube mounted in said supporting structure, a movable shuttle, a tape-gripping finger carried by the shuttle, tape having a free end extending through said tube, said tape-gripping finger being movable by its engagement with the tube into an inoperative position, said finger operating means being operative when the finger is moved out of engagement with the tube to grip said free end of the tape and pull it across the path of movement of said box support, substantially as described.

39. A box covering machine including a carriage, means for moving the carriage to various extents, a box support movable by said carriage, a supporting structure, means for applying a strip of adhesive coated paper to the box, a shuttle, tape gripping means carried by said shuttle, means for conveying the shuttle across the path of movement of the box-supporting member, tape cutting shears, a knock-off lever, means for moving said knock-off lever to release the tape of the gripping means after it has been carried across said box-supporting member, and means for shearing the tape, substantially as described.

40. A box covering machine including a carriage, means for moving the carriage to various extents, a box support movable by said carriage, a supporting structure, means for applying a strip of adhesive coated paper to the box, a shuttle, tape gripping means carried by said shuttle, means for conveying the shuttle across the path of movement of the box-supporting member, tape cutting shears, a knock-off lever, and means for simultaneously moving said knock-off lever to release the tape of the gripping means after it has been carried across said box-supporting member and for actuating said shears to cut the tape, substantially as described.

41. A box covering machine including a carriage, means for moving the carriage to various extents, a box support movable by said carriage, a supporting structure, means for applying a strip of adhesive coated paper to the box, means for conveying tape across the path of movement of said box-supporting member, tape cutting shears, an arm connecting said tape cutting shears, a relatively stationary member having adjustable stops for alternate engagement with said shear connecting arm when the latter is moved, a connecting rod attached to said shears, and means for moving said connecting rod whereby the blades of the shear are moved into cutting engagement with the tape, substantially as described.

42. A box covering machine including a carriage, a box support movable by said carriage, a supporting structure, a roller for pressing an adhesive coated paper on the box carried by said support, arms forming a bearing for said roller, a lever for actuating said arms whereby the roller is moved into and out of engagement with the box, a cam, a bracket secured to said lever and having a sleeve thereon, a rod extending through said sleeve and having a head on one end, means for adjusting the position of said head relatively to said sleeve, and a spring operative to move said lever toward said cam and toward said head, substantially as described.

43. A box covering machine including a carriage, a box support movable by said carriage, a supporting structure, a roller for pressing an adhesive coated paper on the box carried by said support, arms forming a bearing for said roller, a lever for actuating said arms whereby the roller is moved into and out of engagement with the box, a cam, a bracket secured to said lever and having a sleeve thereon, a rod extending through said sleeve and having a head on one end, means for adjusting the position of said head relatively to said sleeve, a stem on said bracket, a link secured to said stem, an adjusting rod, and a spring interposed between said link and adjusting rod whereby the lever is held against said cam and the bracket is moved toward said head, the head on said rod being operative to limit the movement of said lever toward the axis of said cam, substantially as described.

In testimony whereof I have signed my name to this specification in the presence of two subscribing witnesses.

HARRISON S. GIPE.

Witnesses:
S. S. STAUFFER,
H. S. BOMBERGER.

Copies of this patent may be obtained for five cents each, by addressing the "Commissioner of Patents Washington, D. C."